(12) United States Patent
Chen

(10) Patent No.: US 9,223,072 B2
(45) Date of Patent: Dec. 29, 2015

(54) LIGHT GUIDE STRUCTURE HAVING AXIAL-LIGHT BLOCKING REFLECTOR

(71) Applicant: D-Link Corporation, Taipei (TW)

(72) Inventor: I-Hung Chen, Taipei (TW)

(73) Assignee: D-LINK CORPORATION, Taipei (TW)

(*) Notice: Subject to any disclaimer, the term of this patent is extended or adjusted under 35 U.S.C. 154(b) by 175 days.

(21) Appl. No.: 13/740,447

(22) Filed: Jan. 14, 2013

(65) Prior Publication Data
US 2014/0153253 A1   Jun. 5, 2014

(30) Foreign Application Priority Data

Nov. 30, 2012  (TW) .............................. 101144964 A

(51) Int. Cl.
*F21V 13/04* (2006.01)
*F21V 8/00* (2006.01)

(52) U.S. Cl.
CPC .................................... *G02B 6/0008* (2013.01)

(58) Field of Classification Search
USPC ......... 362/555, 545, 539, 540, 166, 303, 305, 362/343; 116/202; 40/555, 576, 579, 580
See application file for complete search history.

(56) References Cited

U.S. PATENT DOCUMENTS

| 1,039,175 | A | * | 9/1912 | Mulholland et al. ............ 40/579 |
| 1,219,583 | A | * | 3/1917 | Perry ............................ 362/517 |
| 1,950,918 | A | * | 3/1934 | Forbes ......................... 362/300 |
| 2,199,014 | A | * | 4/1940 | Stitt ............................. 362/299 |
| 3,401,596 | A | * | 9/1968 | Hirsch ........................... 353/43 |
| 3,703,636 | A | * | 11/1972 | Schmitt ....................... 362/298 |
| 3,936,670 | A | * | 2/1976 | Allen, Sr. ..................... 362/258 |
| 4,209,825 | A | * | 6/1980 | Shackelford ................. 362/299 |
| 4,977,695 | A | * | 12/1990 | Armbruster .................... 40/541 |
| 5,555,161 | A | * | 9/1996 | Roe et al. ..................... 362/555 |
| 7,748,148 | B2 | * | 7/2010 | Reiland et al. ................. 40/564 |

* cited by examiner

*Primary Examiner* — Ismael Negron
(74) *Attorney, Agent, or Firm* — Bacon & Thomas, PLLC

(57) ABSTRACT

A light guide structure including a conical hollow light guide element having reflective inner surface, a light-emitting element (e.g., an LED) provided in one end of the conical light guide element, and a reflective element covering an opening on the other end of the conical light guide element and including a light-permeable region and an opaque reflective region corresponding to an optical axis of the light-emitting element, with the light-permeable region is located around the opaque reflective region and outside the optical axis.

2 Claims, 3 Drawing Sheets

LIGHT GUIDE STRUCTURE HAVING AXIAL-LIGHT BLOCKING REFLECTOR

FIELD OF THE INVENTION

The present invention relates to a light guide structure, more particularly to a light guide structure for guiding light broadly, which has a repeated reflection feature capable of guiding all the light emitted by a light-emitting element to at least one light-permeable region, thereby effectively increasing the range of light projection and simulating a broad light-emitting effect of a plurality of light-emitting elements through using a single light-emitting element.

BACKGROUND OF THE INVENTION

Many electronic devices are equipped with light-emitting elements. Typically, the housing of such an electronic device has a light-permeable or hollowed-out portion, and a light-emitting element is provided at a position corresponding to the light-permeable or hollowed-out portion, thus allowing the light emitted by the light-emitting element to propagate out of the housing through the light-permeable or hollowed-out portion. In addition to serving as an indicator lamp, the light generated by the light-emitting element may enhance the electronic device esthetically and thereby enrich product design. When designing an electronic device having a plurality of such indicator lamps, the arrangement of the indicator lamps can be changed to produce different visual effects. The shape of each indicator lamp can also be changed to bring about even greater variations visually. For example, the housing of the electronic device can be so designed that each light-permeable or hollowed-out portion has a circular, rectangular, star-like, or annular shape, and that, therefore, when the light-emitting elements respectively corresponding in position to the light-permeable or hollowed-out portions emit light, each indicator lamp is lit in the corresponding circular, rectangular, star-like, or annular shape.

While the aforesaid electronic device can be modified in design by changing the shapes or arrangement of the indicator lamps, not every design can be easily put to practical use with good results. Generally speaking, light-emitting diodes (LEDs), which feature high energy conversion efficiency, long service lives, low susceptibility to damage, a short response time, and high reliability, among other advantages, are perfect for low-luminance applications and are hence widely used as the light source of indicator lamps on electronic devices. However, the light emitted by an LED light source is rather concentrated and can directly and effectively illuminate only a small area. If a light-permeable or hollowed-out portion of the housing of an electronic device is of a shape encompassing a large area (e.g., an annular shape) or of a complicated shape, a single LED light source will be insufficient to provide the desired light-emitting effect, given the light-emitting properties and light-emitting capabilities of LED light sources in general. As a solution, a plurality of light-emitting elements are provided for each indicator lamp, with each light-emitting element corresponding in position to a different part of the corresponding indicator lamp. Nevertheless, not only does this design incur higher production costs, but also uneven light emission may result and thus compromise the intended visual effect. To solve the problem of uneven light emission, a light guide plate may be provided to guide the light emitted by a single light-emitting element to the target area, but this is not a cost-effective solution because light guide plates are typically used in the backlights of screens and are more expensive than most light-emitting elements.

It can be known from the above description that although, in theory, an electronic device can be esthetically improved, and thus effectively enhanced in market competitiveness, by changing the shapes and so on of its indicator lamps, uneven light emission tends to arise when the light-permeable or hollowed-out portions of the housing of the electronic device are of large or complicated shapes. Furthermore, existing solutions to the problem of uneven light emission often lead to a significant increase in production costs and consequently to low market competitiveness. Apparently, the esthetic design of electronic devices has been limited to a large extent by the light-emitting properties, light-emitting effects, and costs of the light sources used. These limiting factors have hindered designers' creativity and prevented an otherwise much greater variety of products from being produced, which is truly a shame. Therefore, the issue to be addressed by the present invention is to design a light guide structure for guiding light broadly, wherein the light guide structure is made of a low-cost light guide material and can guide the light of a single light-emitting element to imitate the broad light-emitting effect of multiple light-emitting elements used together. It is also desirable that the light guide structure enables uniform light emission. The ultimate goal is to allow designers to design electronic devices having various visual effects and hence increased competitiveness without being constrained by costs.

BRIEF SUMMARY OF THE INVENTION

In view of the fact that a breakthrough in the design of indicator lamps for electronic devices is unattainable due to limitations imposed by the light-emitting properties, light-emitting effects, and costs of the light sources to be used, the inventor of the present invention put years of practical experience in the industry into repeated trials and improvements and finally succeeded in developing a light guide structure for guiding light broadly as disclosed herein. The present invention is intended for guiding light in a low-cost manner in which a single light-emitting element is used as the light source and is enabled not only to imitate the broad light-emitting effect of a plurality of light-emitting elements used together, but also to provide uniform light emission, allowing a designer to design electronic devices of variegated visual effects and hence of high market competitiveness.

It is an object of the present invention to provide a light guide structure for guiding light broadly. The light guide structure is installed in a housing of an electronic device and corresponds in position to a hollowed-out portion or a light-permeable portion of the housing. The light guide structure includes a conical light guide element and a partially blocking reflective element. The conical light guide element is a hollow cone and has an inner surface configured as a reflective surface for reflecting light. A light-emitting element (e.g., an LED) is provided in the conical light guide element and is adjacent to the pointed end of the conical light guide element. The other end (hereinafter referred to as the second end) of the conical light guide element is an opening corresponding in position to the hollowed-out portion or the light-permeable portion of the housing. The partially blocking reflective element is installed at the second end of the conical light guide element, covers the opening, and includes at least one light-permeable region and at least one opaque reflective region. The at least one opaque reflective region corresponds in position to the optical axis of the light-emitting element. The at least one light-permeable region, on the other hand, is located around the at least one opaque reflective region and is outside the optical axis of the light-emitting element. After the light emitted by the light-emitting element passes through the conical light guide element, a portion of the light penetrates the at least one light-permeable region, and the remaining portion of the light is reflected back into the conical light guide element by blocked reflection of the at least one opaque reflective region and is then reflected to the partially blocking reflective element by conical reflection of the reflective surface. Thus, the aforesaid remaining portion of the light emitted by the light-emitting element undergoes the blocked reflection and the conical reflection repeatedly until it is projected to and penetrates the at least one light-permeable region and propagates out of the housing through the hollowed-out portion or the light-permeable portion. Thanks to the repeated reflection feature of the light guide structure, all the light emitted by the light-emitting element will be guided to the at least one light-permeable region, thereby effectively increasing the range of light projection. This allows the broad light-emitting effect of a plurality of light-emitting elements used together to be simulated by a single light-emitting element, and production costs can hence be effectively reduced. In addition, as a single light-emitting element is used as the light source in the present invention to simulate the broad light-emitting effect of multiple light-emitting elements, uneven light emission which may otherwise result from the use of multiple light-emitting elements, or more particularly from the differences in their light emission efficiency, is avoided.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
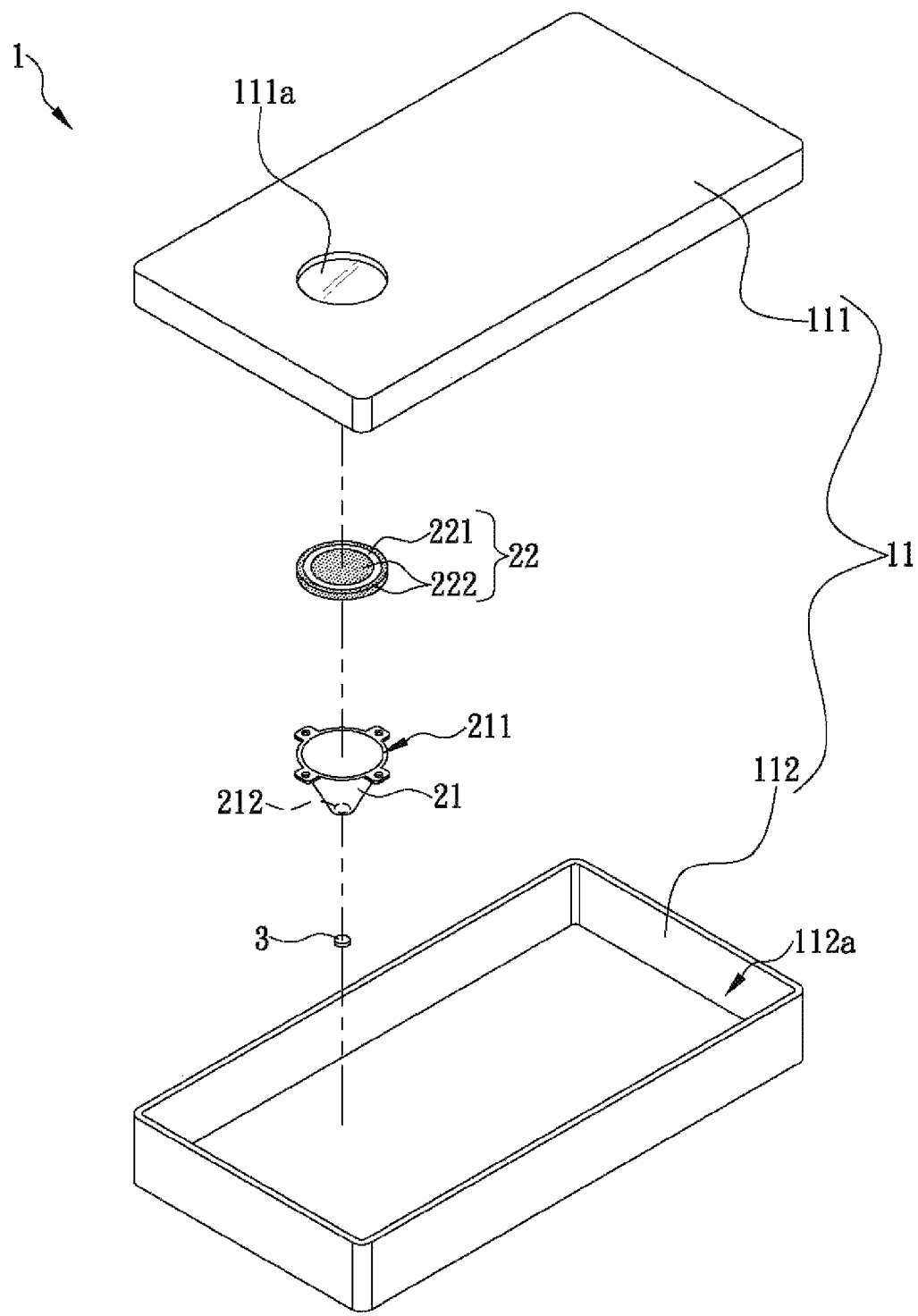
FIG. 1 is an exploded perspective view of the first preferred embodiment of the present invention.

The present invention discloses a light guide structure for guiding light broadly. Referring to FIG. 1, the light guide structure according to the first preferred embodiment of the present invention is installed in a housing 11 of an electronic device 1 and corresponds in position to a light-permeable portion 111a (or a hollowed-out portion) of the housing 11. In the first preferred embodiment, the housing 11 is assembled from an upper housing member 111 and a lower housing member 112. The upper housing member 111 is provided with a round light-permeable portion 111a, and the light guide structure is installed at a position corresponding to the light-permeable portion 111a. The lower housing member 112, on the other hand, is provided with a receiving space 112a for receiving the light guide structure as well as a circuit board (not shown) and other components (not shown) of the electronic device 1. The formation and assembly method of the housing 11 are not major technical features of the present invention and therefore may be changed as needed without departing from the core spirit of the present invention. In the first preferred embodiment, the round light-permeable portion 111a is provided on the housing 11 (or more specifically on the upper housing member 111), and yet the present invention is not limited to this configuration. One who tries to design the housing 11 of the electronic device 1 not only may replace the light-permeable portion 111a with a hollowed-out portion, but also may design the upper housing member 111 as being made entirely of a translucent material. In the latter case, the foregoing arrangement of having the light guide structure installed at a position corresponding to the light-permeable portion 111a can be easily achieved by installing the light guide structure at a position corresponding to the upper housing member 111. In other words, the emphasis here is on the spatial correspondence between the light guide structure and the light-permeable portion 111a rather than on a total match between their physical shapes.

Figure 2:
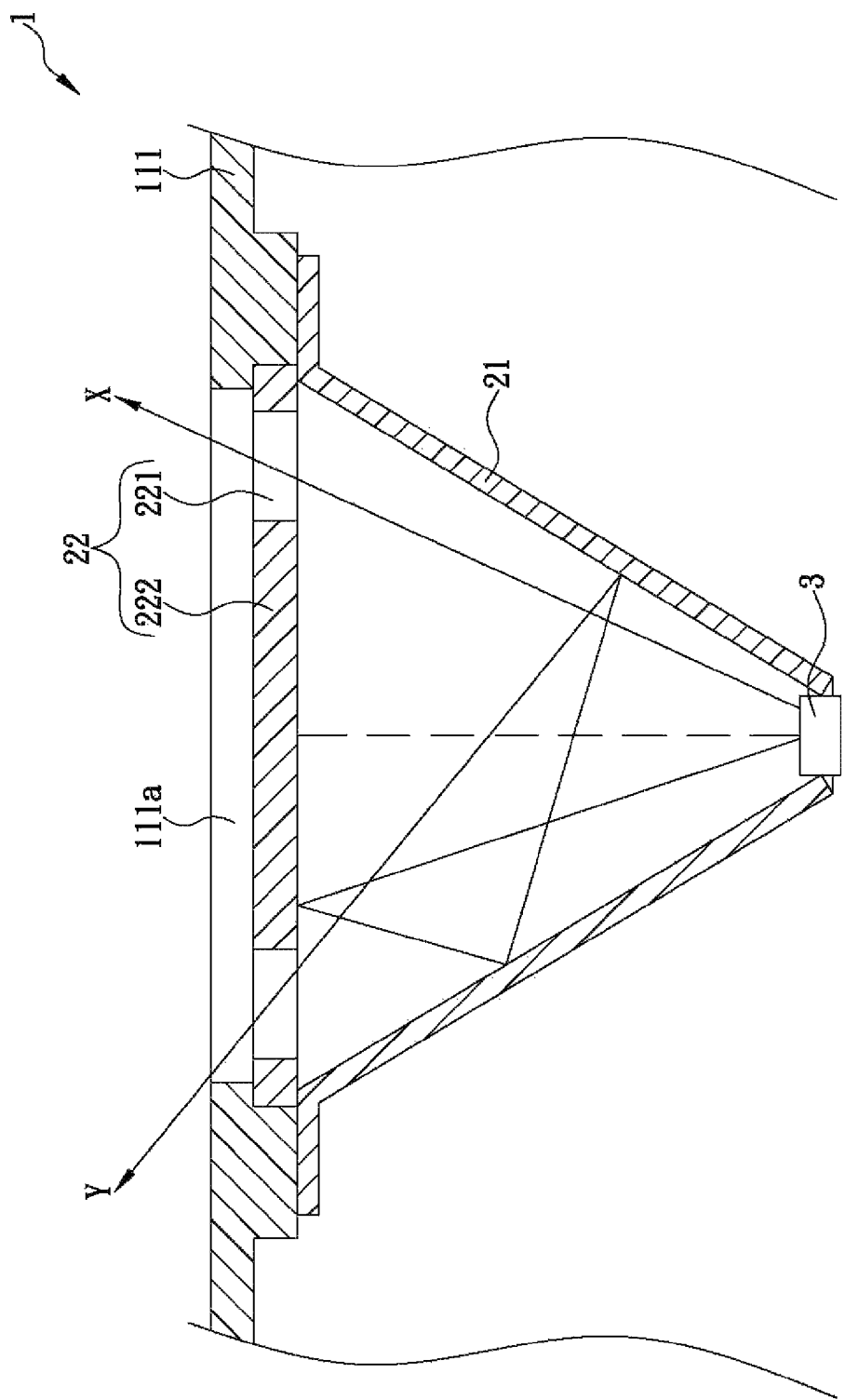
FIG. 2 is a sectional view of the first preferred embodiment of the present invention.

As shown in FIG. 1 and FIG. 2, the light guide structure in the first preferred embodiment of the present invention includes a conical light guide element 21 and a partially blocking reflective element 22. The conical light guide element 21 is a hollow cone and has an inner surface configured as a reflective surface for reflecting light. The conical light guide element 21 is provided therein with a light-emitting element 3 (e.g., an LED) adjacent to the pointed end of the conical light guide element 21. The other end (hereinafter referred to as the second end) of the conical light guide element 21 is formed as an opening 211 which corresponds in position to the light-permeable portion 111a of the housing 11. The light-emitting element 3 generates a light beam and projects it to the opening 211 along the central axis of the conical light guide element 21. In the present embodiment, the pointed end of the conical light guide element 21 is formed with an aperture 212, thus allowing the light-emitting element 3 to be installed in the conical light guide element 21 by way of the aperture 212 at the pointed end of the conical light guide element 21. However, the present invention is not limited to the configuration described above. The design of the conical light guide element 21 may be modified in such a way that the pointed end of the conical light guide element 21 is closed and that the light-emitting element 3 is directly placed in the conical light guide element 21 and is electrically connected to the circuit board outside the conical light guide element 21 by wires. This modified design is equally capable of producing the intended effect.

The partially blocking reflective element 22 is installed at the second end of the conical light guide element 21 and covers the opening 211. The partially blocking reflective element 22 includes at least one light-permeable region 221 and at least one opaque reflective region 222. The at least one opaque reflective region 222 corresponds in position to the optical axis of the light-emitting element 3, whereas the at least one light-permeable region 221 is located around the at least one opaque reflective region 222 and outside the optical axis of the light-emitting element 3. The partially blocking reflective element 22 in this embodiment is a planar disc, but the present invention is not limited to such a design. For example, the partially blocking reflective element 22 may have a curved surface on one or each of its two opposite sides or have a rectangular, star-like, or other shape. In a nutshell, the partially blocking reflective element 22 may be designed according to practical needs, provided that it includes the at least one opaque reflective region 222, which corresponds in position to the optical axis of the light-emitting element 3, and the at least one light-permeable region 221, which is located outside the optical axis of the light-emitting element 3. Moreover, in the first preferred embodiment, the side of the partially blocking reflective element 22 that can reflect light covers the opening 211 of the conical light guide element 21, and the other side of the partially blocking reflective element 22 is attached to the light-permeable portion 111a of the upper housing member 111; thus, the partially blocking reflective element 22 is located between the conical light guide element 21 and the light-permeable portion 111a. Nevertheless, the present invention is not limited to the foregoing configuration. For example, with the housing 11 having a hollowed-out portion in place of the light-permeable portion 111a, the partially blocking reflective element 22 may be embedded in the hollowed-out portion, and the object of the present invention is still attainable.

Referring to FIG. 2, a portion of the light emitted by the light-emitting element 3 (e.g., the portion travelling along the optical path X) is projected directly to the at least one light-permeable region 221 and, after passing sequentially through the at least one light-permeable region 221 and the light-permeable portion 111a of the upper housing member 111, propagates out of the electronic device 1. Meanwhile, the remaining portion of the light emitted by the light-emitting element 3 (e.g., the portion travelling along the optical path Y) is reflected back into the conical light guide element 21 by blocked reflection of the at least one opaque reflective region 222 and is then reflected to the partially blocking reflective element 22 by conical reflection of the reflective surface. Thus, after repetition of the blocked reflection and of the conical reflection, the aforesaid remaining portion of light is projected to the at least one light-permeable region 221, passes sequentially through the at least one light-permeable region 221 and the light-permeable portion 111a, and propagates out of the electronic device 1. Consequently, all the light emitted by the light-emitting element 3 is guided to the at least one light-permeable region 221, and the range of light projection is effectively expanded. It should be pointed out that the terms "blocked reflection" and "conical reflection" are used only to distinguish the locations where reflection takes place; both terms refer to "reflection" as generally understood in physics.

Figure 3:
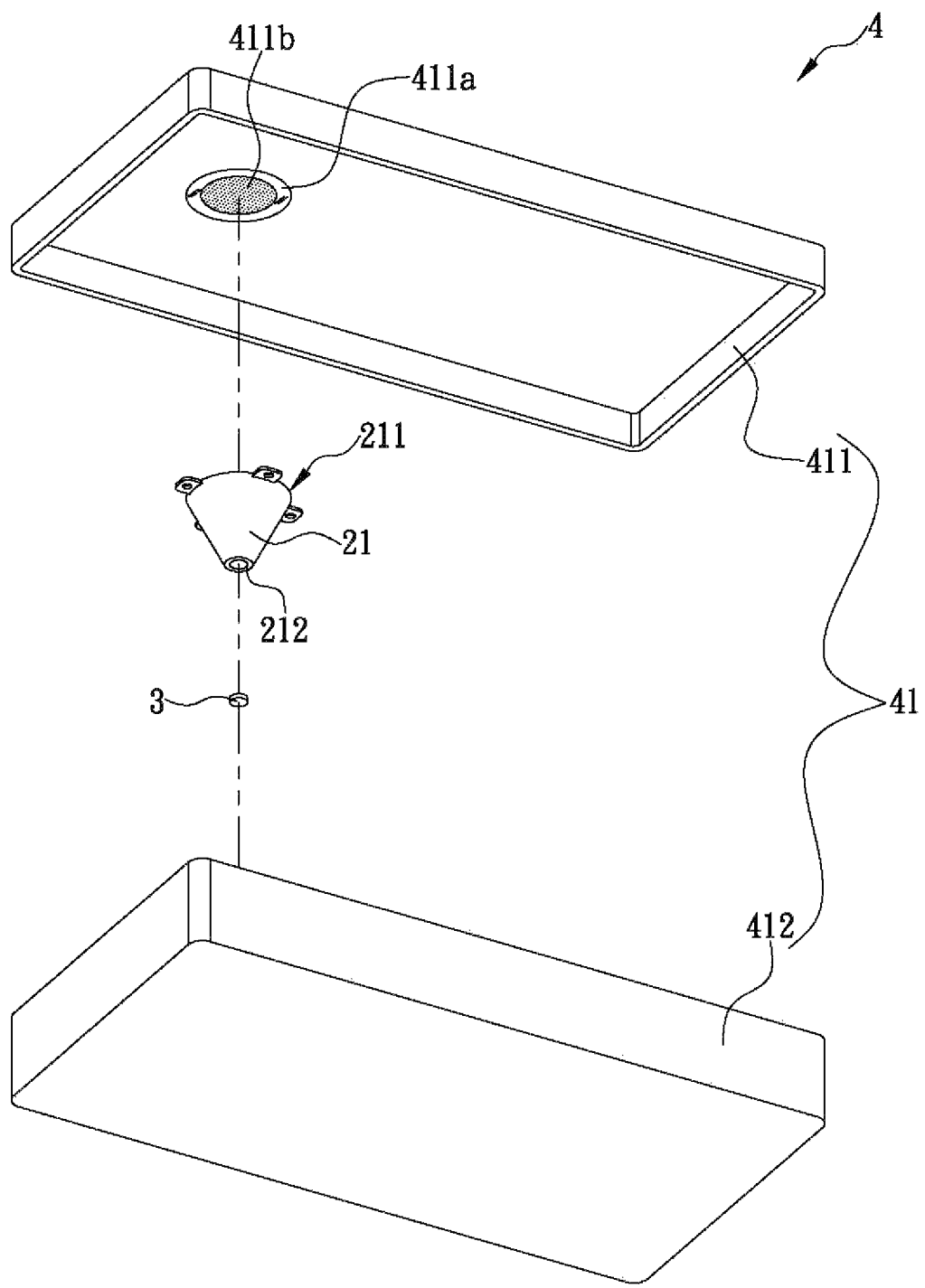
FIG. 3 is an exploded perspective view of the second preferred embodiment of the present invention.

FIG. 3 shows the second preferred embodiment of the present invention, in which the light guide structure is provided in a housing 41 of an electronic device 4 and includes a conical light guide element 21, an opaque reflective region 411b, and a light-permeable portion 411a. The conical light guide element 21, to be installed on an inner surface of the housing 41, is a hollow cone and has an inner surface configured as a reflective surface for reflecting light. A light-emitting element 3 is provided in the conical light guide element 21 and is adjacent to the pointed end thereof. The other end (hereinafter referred to as the second end) of the conical light guide element 21 is formed as an opening 211. The opaque reflective region 411b is formed by a part of the housing 41. More specifically, in the second preferred embodiment, where the housing 41 includes an upper housing member 411 and a lower housing member 412, the opaque reflective region 411b is formed by a part of the upper housing member 411. Once the conical light guide element 21 is installed on the inner surface of the housing 41, the optical axis of the light-emitting element 3 corresponds in position to the opaque reflective region 411b, and the opaque reflective region 411b does not block the opening 211 completely. The light-permeable portion 411a is also formed by a part of the upper housing member 411 and is located around the opaque reflective region 411b. Once the conical light guide element 21 is installed on the inner surface of the housing 41, the opening 211 of the conical light guide element 21 corresponds in position to the light-permeable portion 411a, which, however, is located outside the optical axis of the light-emitting element 3. In the second preferred embodiment, the opaque reflective region 411b is a layer of reflective paint coated on a portion of the inner surface of the upper housing member 411, but the present invention is not limited to this arrangement. In practice, the reflective paint may be coated on the outer surface of the upper housing member 411 instead or be implemented by other means (e.g., by attaching a reflective plate to the housing 41). In short, the design of the opaque reflective region 411b may vary as appropriate.

In the second preferred embodiment, a portion of the light emitted by the light-emitting element 3 is projected directly to the light-permeable portion 411a and therefore propagates out of the electronic device 4 directly. At the same time, the remaining portion of the light emitted by the light-emitting element 3 is reflected back into the conical light guide element 21 by blocked reflection of the opaque reflective region 411b, is projected to the light-permeable portion 411a by repeated blocked reflection of the opaque reflective region 411b and repeated conical reflection of the conical light guide element 21, and eventually propagates out of the housing 41 through the light-permeable portion 411a.

According to the above, the repeated reflection feature of the light guide structure makes it possible to guide all the light of the light-emitting element 3 to the light-permeable portion 411a (or the at least one light-permeable region 221 shown in FIG. 1), thereby effectively increasing the range of light projection, enabling the single light-emitting element 3 to simulate the broad light-emitting effect of a plurality of light-emitting elements used together. As a result, production costs which may otherwise result from the use of multiple light-emitting elements are effectively reduced. Now that the present invention uses the single light-emitting element 3 as the light source to simulate the broad light-emitting effect of multiple light-emitting elements, the problem of uneven light emission attributable to the differences in light emission efficiency of multiple light-emitting elements is eliminated. Hence, the esthetic design of electronic devices is no more subject to limitations imposed by the light-emitting properties, light-emitting effects, and costs of the light sources used but is greatly enhanced in flexibility. This allows a manufacturer to produce electronic devices having different visual effects and consequently high market competitiveness.

While the invention herein disclosed has been described by means of specific embodiments, numerous modifications and variations could be made thereto by those skilled in the art without departing from the scope of the invention set forth in the claims.

What is claimed is:

1. A light guide structure for an electronic device comprising:
   a housing;
   an LED;
   a hollow conical light guide element installed on an inner surface of the housing and having a reflective inner surface and an open end opposite to a pointed end thereof, wherein the LED is provided at the pointed end of the light guide element for generating a light beam and projecting the light beam to the open end along a central axis of the light guide element;
   an opaque reflective region formed by a part of the housing as a flat plate and corresponding to the central axis, wherein the opaque reflective region does not block the open end completely; and
   a light-permeable portion formed by a part of the housing as a flat plate and located around the opaque reflective region and outside the central axis, wherein the open end corresponds to the light-permeable portion.

2. The light guide structure of claim 1, wherein the light-emitting element is provided adjacent the pointed end.

* * * * *